United States Patent Office 3,385,850
Patented May 28, 1968

3,385,850
N-SUBSTITUTED BICYCLIC AZACYCLES
Richard William James Carney, Murray Hill, Herbert Morton Blatter, Millburn, and George de Stevens, Summit, N.J., assignors to Ciba Corporation, New York, N.Y., a corporation of Delaware
No Drawing. Continuation-in-part of application Ser. No. 351,200, Mar. 11, 1964. This application Jan. 21, 1965, Ser. No. 427,151
20 Claims. (Cl. 260—240.7)

ABSTRACT OF THE DISCLOSURE

Bicyclic 4-arylidenemethyl-pyrimidinium salts of the formula

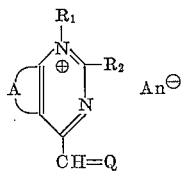

A=alkylkylene with 3–5 C.
$R_{1,2}$=alkyl, aralkyl or aryl
Q=mono- or bicyclic aza-, oxa- or thiacyclic arylidene
$An^{\ominus}$=halide ion are dyes and sensitizers of photographic emulsions.

---

This application is a continuation in part of our application Ser. No. 351,200 filed Mar. 11, 1964, now abandoned.

The present invention concerns and has for its object the provision of bicyclic pyrimidinium compounds and methods for their preparation.

More particularly the present invention relates to compounds of the formula

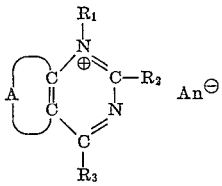

in which A stands for a divalent saturated or unsaturated aliphatic radical having from three to five carbon atoms as ring members and at most one double bond, each of the groups $R_1$ and $R_2$ for an aliphatic or aromatic radical, $R_3$ for an aliphatic mercapto group or an N-substituted azacyclic arylidene-methyl group in which the ring-nitrogen is part of an enamine grouping, and $An^{\ominus}$ stands for the anion of an acid or the hydroxyl ion.

A divalent aliphatic radical representing the group A is preferably represented by a lower alkylene or alkenylene radical having at least three carbon atoms, such as 1,3-propylene, 1,4-butylene, 2,2-dimethyl-1,4-butylene, 1,4 - or 1,5 - pentylene; 1,3 - prop - 1 - enylene, 1,4-but-1-enylene, 1,4-but-2-enylene or 1,5-pent-1-enylene. These aliphatic radicals are preferably unsubstituted but may be substituted by one or more than one substituent located in any position available for substitution, such as etherified hydroxy, for example lower alkoxy, such as methoxy, ethoxy, n-or i-propoxy or n-butoxy, esterified hydroxy, for example halogeno, such as fluoro, chloro or bromo, trifluoromethyl, etherified mercapto, for example lower alkyl-mercapto, such as methyl-or ethylmercapto, nitro, disubstituted amino, for example, di-lower alkyl-amino, such as dimethylamino or diethylamino, as well as oxo or thiono.

An aliphatic radical representing $R_1$ and $R_2$ is especially an alkyl radical having up to twelve carbon atoms, such as methyl, ethyl, n-propyl, isopropyl, n-butyl, n-pentyl, n-hexyl, n-heptyl, n-octyl, n-nonyl, n-decyl or n-undecyl. It may also be an alkenyl radical having up to twelve carbon atoms, such as allyl or undecenyl, a cycloaliphatic or cycloaliphatic-aliphatic radical, such as cycloalkyl or cycloalkyl-lower alkyl having from three to eight, especially from five to seven, ring members, e.g. cyclopropyl, cyclopentyl, cyclohexyl, cycloheptyl, or cyclooctyl, cyclopropylmethyl, cyclopentylmethyl, 2 - cyclopentylethyl, cyclohexylmethyl, 1-cyclohexylethyl or cycloheptylmethyl, an araliphatic radical, such as monocyclic carbocyclic aryl-lower alkyl, e.g. benzyl, 1-phenylethyl or 2-phenylethyl.

An aromatic radical representing $R_1$ and $R_2$ is particularly a monocyclic carbocyclic aryl radical, i.e. phenyl or substituted phenyl. It may also be a bicyclic carbocyclic aryl radial, i.e. naphthyl or substituted naphthyl, or a heterocyclic, particularly monocyclic aryl radical, such as pyridyl, thienyl or furyl.

Said radicals $R_1$ and $R_2$ may be unsubstituted or may have one or more than one of the same or different substituents attached to any position available for substitution especially in the aromatic portion. They are, for example, lower alkyl, e.g. methyl, ethyl, n-propyl or isopropyl, etherified hydroxy, such as lower alkoxy, e.g. methoxy, ethoxy, n-propoxy, isopropoxy or n-butoxy, esterified hydroxy, such as halogeno e.g. fluoro, chloro or bromo, trifluoromethyl, etherified mercapto, such as lower alkylmercapto, e.g. methylmercapto or ethylmercapto, nitro, disubstituted amino, such as di-lower alkyl-amino, e.g. dimethylamino or diethylamino, alkylene-imino in which alkylene has from four to six carbon atoms, e.g. pyrrolidino or piperidino, oxo or thiono.

A mono- or bicyclic carbocyclic aryl radical, therefore, is primarily phenyl, (lower alkyl)-phenyl, (lower alkoxy)-phenyl, (halogeno)-phenyl, (trifluoromethyl)-phenyl, (lower alkylmercapto)-phenyl, (nitro)-phenyl, (di-lower alkyl-amino)-phenyl, 1-naphthyl, 2-naphthyl, (lower alkyl)-naphthyl, (lower alkoxy)-naphthyl, (halogeno)-naphthyl, (trifluoromethyl)-naphthyl, (lower alkylmercapto)-naphthyl, (nitro)-naphthyl or (dilower alkylamino)-naphthyl.

An aliphatic mercapto group representing $R_3$ is especially lower alkylmercapto, but may also be a mercapto group containing those aliphatic radicals shown for $R_1$ and $R_2$.

The azacyclic arylidenemethyl group representing $R_3$ has, for example, the formula

in which $R_4$ is above all hydrogen, but may also stand for one of the radicals listed for $R_1$ and $R_2$ and Q stands for an N-substituted mono- or polycyclic, especially bicyclic, azacyclic arylidene radical, such as a 1-substituted 2-pyridylidene, a 1-substituted 4-pyridylidene, a 1-substituted 2-quinolylidene, a 1-substituted 4-quinolylidene, a 2-substituted 1-isoquinolylidene, a 3-substituted 2-thiazolylidene, a 3-substituted 2-benzothiazolylidene, a 3-substituted 2-oxazolylidene, a 3-substituted 2-benzoxazolylidene or a 1,3,3-trisubstituted 2-indolylidene radical in which the ring-nitrogen is part of an enamine grouping.

In the above azacyclic radicals representing Q, the substituent of the ring-nitrogen is above all a lower alkyl radical or one of the other radicals listed under $R_1$ and $R_2$. Apart from the group substituting the ring-nitrogen, the azacyclic ring is unsubstituted or may have one or more than one additional substituent, such as lower alkyl, etherified hydroxy, e.g. lower alkoxy, esterified hydroxy, e.g. halogeno, trifluoromethyl, etherified mercapto, e.g. lower alkylmercapto, nitro or disubstituted amino, e.g. di-lower alkyl-amino, of the meaning given above.

The in $An^{\ominus}$ is above all the anion of an acid, primarily the anion of an inorganic acid, especially of a hydrohalic acid, e.g. hydrochloric, hydrobromic or hydriodic acid, or of sulfuric, thiocyanic or perchloric acid, as well as the anion of an organic acid, such as a carboxylic or sulfonic acid, e.g. acetic, oxalic, maleic, hydroxymaleic, fumaric, malic, tartaric, citric, benzoic or salicylic acid or more especially of methane, ethane or 2-hydroxyethane sulfonic, 1,2-ethane disulfonic, benzene sulfonic, p-toluene sulfonic or 2-naphthalene sulfonic acid or of a monobasic organic sulfuric acid, such as a lower alkyl sulfuric acid, e.g. methyl or ethyl sulfuric acid, as well as the anion of an acidic organic nitro compound, e.g. picric, picrolonic or flavianic acid or of a metal complex acid, e.g. phosphotungstic, phosphomolybdic, chloroplatinic or Reinecke acid. In the event that the compounds of this invention are used for pharmaceutical purposes, the anion $An^{\ominus}$ is that of a pharmaceutically acceptable acid.

The compounds of this invntion have pharmacological properties, particularly antimicrobial effects, for example, against gram-positive bacteria, e.g. *Diplococcus pneumoniae, Staphylococcus aureus* and the like, against gram-negative bacteria, e.g. *Escherichia coli, Pseudomonas aeruginosa, Salmonella cholerasius* and the like, against acid-fast bacteria, e.g. *Microbacterium tuberculosis* and the like, against fungi, e.g. *Candida albicans, Cryptococcus neoformans, Histoplasma capsulatum, Trichophyton mentagrophytes* and the like, as well as against protozoa, e.g. *Trichomonas vaginalis* and the like. They are, therefore, useful as antimicrobial agents, either topically or systemically, against bacterial, fungal, or protozoal infections. They also show activities against helmints, such as *Nippostrongylus muris* and the like, and are, therefore, useful as anthelmintic agents.

The compounds substituted by the azacyclic arylidenemethyl group represent cyanine dyes containing at least two auxochromic nitrogen atoms, one being of tertiary, the other of quaternary characteristics. One of these nitrogen atoms is the ring member of one heterocyclic ring system, the second of another heterocyclic ring system, and both are linked with each other through a chain of conjugated double bonds. These dyes are also excellent sensitizers of photographic emulsions without causing excessive fog or residual dye stain.

Especially useful are the compounds of the formulae

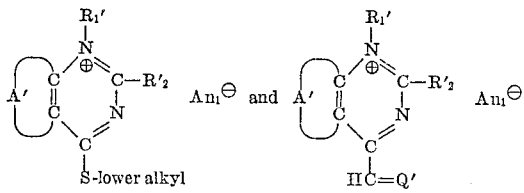

in which $A'$ stands for alkylene having from three to five carbon atoms, each of the groups $R'_1$ and $R'_2$ for alkyl having up to 12 carbon atoms, monocyclic carbocyclic aryl-lower alkyl or monocyclic carbocyclic aryl, $Q'$ for an at most bicyclic N-lower alkyl-azacyclic arylidene, N-lower akyl-thiazacyclic arylidene or N-lower alkyl-oxazacyclic arylidene radical, in which the ring-nitrogen is part of an enamine grouping, and $An_1^{\ominus}$ for the anion of a hydrohalic acid.

Particularly useful are those compounds of the above formulae in which $A'$ stands for 1,4-butylene, $R'_1$ for alkyl with up to 12 carbon atoms, phenyl, (lower alkyl)-phenyl, (lower alkoxy)-phenyl, (halogeno)-phenyl, (lower alkylmercapto) - phenyl or (nitro) - phenyl, $R'_2$ for phenyl, (lower alkyl)-phenyl, (lower alkoxy)-phenyl, (halogeno) - phenyl, (lower alkymercapto) - phenyl or (nitro)-phenyl, $Q'$ for 1-lower alkyl-2-pyridylidene, 1-lower alkyl-4-pyridylidene, 1-lower alkyl-2-quinolylidene, 1-lower alkyl-4-quinolylidene, 2-lower alkyl-1-isoquinolylidene, 3-lower alkyl-2-thiazolylidene, 3-lower alkyl-2-benzothiazolylidene, 3-lower alkyl-2-oxazolylidene, 3-lower alkyl-2-benzoxazolylidene or 1,3,3-tri-lower alkyl-2-indolylidene, or one of these radicals having lower alkyl, lower alkoxy, halogen, lower alkylmercapto, nitro or di-lower alkyl-amino as substituents, and $An_1'$ for the anion of a hydrohalic acid.

The compounds of this invention are prepared according to known methods. For example, the process for their preparation consists in:

(a) reacting a compound of the formula

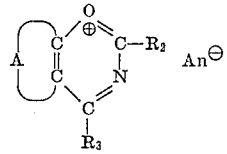

with the amine $R_1$—$NH_2$ or (b) treating a compound of the formula

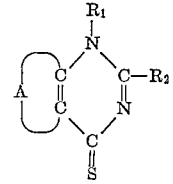

with a reactive ester of an aliphatic alcohol and, if desired, reacting a so obtained 4-mercapto-compound with a quaternary N-substituted azacyclic arylmethyl compound of which the methyl group contains at least two hydrogen atoms and the ring nitrogen is capable of forming an enamine grouping and, if desired, converting in a quaternary compound obtained the anion $An^{\ominus}$ into the hydroxyl ion or another anion.

Process (a) is carried out by combining the reactants, preferably in the presence of a solvent or solvent mixture, such as an alcohol, e.g. methanol or ethanol, advantageously at an elevated temperature, if necessary in a closed vessel under pressure and/or in the atmosphere of an inert gas, e.g. nitrogen.

A reactive ester of the aliphatic alcohol used in process (b) is, for example, an ester of an inorganic acid, particularly a hydrohalic acid, e.g. hydrochloric, hydrobromic or hydriodic acid, as well as of sulfuric acid, or of a suitable organic acid, especially a strong organic sulfonic acid, e.g. methane sulfonic, 2-hydroxyethane sulfonic or p-toluene sulfonic acid.

Although the reaction with the reactive ester (either equivalent or excess amounts thereof) can be carried out in the absence of a diluent, it is preferably performed in the presence of a suitable solvent, such as a ketone, e.g. acetone, or an alcohol, e.g. ethanol, or a solvent mixture, if necessary, while cooling or at an elevated temperature, and/or in a closed vessel under increased pressure and/or, in the atmosphere of an inert gas.

If desired, a resulting 4-mrecapto-compound may be reacted with the quaternary reagent of the formula $[Q_0—CH_2—R_4]^{\oplus} An^{\ominus}$, in which $Q_0$ stands for a quarternary N-substituted azacyclic aryl group capable of furnishing the group Q. $Q_0$ is more especially a quarternary 2-pyridyl, 4-pyridyl, 2-quinolyl, 4-quinolyl, 1-isoquinolyl, 2-thiazolyl, 2-benzothiazolyl, 2-oxazolyl, 2-benzoxazolyl or 3,3-disubstituted 2-indolenyl group, particularly an at most bicyclic lower alkyl quaternary azacyclic aryl, thiazacyclic aryl or oxazacyclic aryl radical which may also be substituted as shown above, whereas $R_4$ has the previously-given meaning, but represents primarily hydrogen, and $An^{\ominus}$ is above all a halogen ion.

The reaction is preferably performed in the presence of an acid neutralizing reagent, such as an alkali metal or alkaline earth metal lower alkoxide, e.g. sodium, potassium, magnesium or barium methoxide, ethoxide, n-propoxide, isopropoxide or n-butoxide, an alkali metal or alkaline earth metal carbonate, e.g. sodium, potassium or calcium carbonate, or, more especially, a suitable organic base, such as pyridine or collidine, but particularly an aliphatic amine, such as tri-lower alkyl-amine, e.g. trimethylamine, N,N-dimethyl-N-ethyl-amine or triethylamine, as well as an N,N,N',N'-tetra-lower alkyl-alkylene-diamine, e.g. N,N,N',N'-tetramethyl- 1,6-hexylenediamine, an N-lower alkyl-N,N-alkylene-imine, in which alkylene has from four to six chain members, e.g. N-methyl-pyrrolidine, N-methyl-piperidine or N-ethyl-piperidine, an N-lower alkyl-morpholine, e.g. N-methyl-morpholine or a mixture thereof, such as a mixture of pyridine and an aliphatic tertiary amine, e.g. triethylamine.

If necessary, the reaction is performed in the presence of an additional solvent or solvent mixture, at an elevated temperature and/or in the atmosphere of an inert gas, e.g. nitrogen.

As indicated above, the anion in a resulting quarternary compound may be converted into another anion; such conversion is carried out according to known methods. Thus, the anion of an acid may be replaced by the hydroxyl anion, for example, by reacting a resulting quaternary halide with silver oxide or a quaternary sulfate with barium hydroxide, by treating a quaternary salt with an anion exchange preparation, or by electrodialysis or any other suitable method. From a resulting quaternary hydroxide, there may be obtained quaternary salts by reacting the quaternary base with an acid, for example, one of those previously mentioned, or with a mono-lower alkyl sulfate, e.g. methyl or ethyl sulfate. A resulting quaternary salt may also be converted directly into another quaternary salt without the formation of an intermediate quaternary hydroxide. For example, a quaternary iodide may be reacted with freshly prepared silver chloride or with hydrochloric acid in anhydrous methanol to yield the quaternary chloride; a quaternary salt may also be converted into another quaternary salt by treatment with an anion exchange preparation.

The starting materials used in the above procedure are new and are intended to be included within the scope of this invention. They are especially represented by the compounds of the formulae

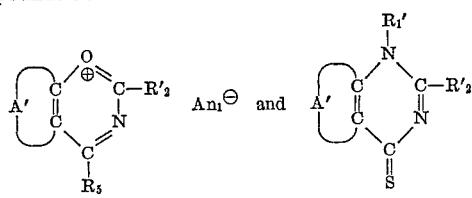

in which $R_5$ stands for lower alkylmercapto or the group —CH=Q'. The latter are prepared, for example, by reacting an enamine compound of the formula

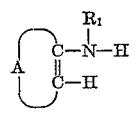

(which is prepared by treating the corresponding saturated cyclic ketone with the amine $R_1$—$NH_2$, if necessary, while removing water, for example, by azeotropic distillation), with a compound of the formula

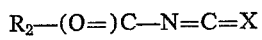

$$R_2—(O=)C—N=C=X$$

in which X stands for oxo or thiono and, if necessary, converting in a resulting compound having an oxo group in the 4-position of the pyrimidine portion, such group into the desired thiono group.

The above shown N-acylated isocyanate and N-acylated isothiocyanate reagents are prepared, for example, by reacting silver nitrate with an alkali metal, e.g. sodium or potassium, isocyanate or isothiocyanate in the presence of a suitable diluent, e.g. diethyl ether and adding the slurry of the resulting silver isocyanate or silver isothiocyanate to a diethyl ether solution of the acyl halide $R_2$—CO—Hal. The resulting precipitate is filtered off, the filtrate is evaporated and, if necessary, the desired N-acyl-isocyanate or N-acyl-isothiocyanate compound is purified, for example, by distillation.

The second step in the above procedure is carried out, for example, by mixing the two reagents, advantageously in the presence of a suitable diluent, e.g. tetrahydrofuran, p-dioxane, dimethoxyethane, diethyleneglycol dimethyl ether, diethyl ether, chloroform or toluene, or a mixture of diluents; usually, the reaction mixture is heated to from about 50° C. to about 120° C., if necessary, in a closed vessel, and/or in the atmosphere of an inert gas, e.g. nitrogen.

The above starting materials are also obtained, for example, by reacting an enamine compound of the formula

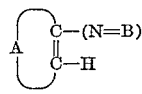

in which the grouping of the formula —(N=B) is a di-substituted amino group, such as di-lower alkyl-amino, e.g. dimethylamino or diethylamino or, more especially, alkyleneimino, in which alkylene has from four to seven carbon atoms, particularly pyrrolidino or piperidino as well as 4-morpholino, with a compound of the formula $R_2$—(O=)C—N=C=X and reacting the resulting compound of the formula

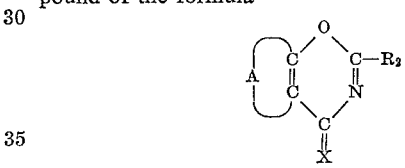

if desired, after having converted an oxo group representing X into a thiono group, with the amine $R_1$—$NH_2$ and, if necessary, converting in a resulting compound, in which the group X stands for oxo, the latter into thiono.

The above reaction of the enamine compound with the N-acyl-isocyanate or N-acyl-isothiocyanate reagent is carried out as previously shown; the conversion of the oxazine-type intermediate into the pyrimidine-type compound is achieved by reacting the intermediate with the amine in the presence of a suitable solvent, e.g. ethanol, or mixture of solvents, preferably at an elevated temperature.

The starting materials used in the above procedure, particularly those, in which $R_1$ and $R_2$ represent aryl radicals, are also prepared by reacting an enamine compound of the penultimate formula with an imidoyl-isocyanate or isothiocyanate compound of the formula

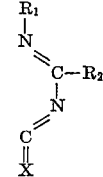

and if necessary, converting in a resulting compound, in which the group X stands for oxo, the latter into thiono.

The above reaction is preferably carried out in the presence of a solvent or solvent mixture, and, if necessary, while cooling or at an elevated temperature in a closed vessel, and/or in the atmosphere of an inert gas. The imidoyl-isocyanate and imidoyl-isothiocyanate reagents are prepared from the corresponding halides, e.g chlorides, by treatment with a metal, e.g. potassium or lead, cyanate or thiocyanate.

As indicated above, the oxo group in the 4-position of the pyrimidine portion of a resulting starting material is converted into the thiono group; the conversion is carried out according to known methods, for example, by treatment with phosphorus pentasulfide in the presence of a high-boiling solvent, e.g. xylene.

The starting materials used in the above procedure are prepared, for example, by reacting the previously mentioned intermediate compounds of the formula

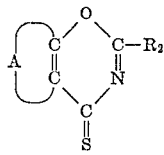

with a reactive ester of an aliphatic alcohol and, if desired, converting the anion portion of the resulting quaternary compound into another anion. The above reaction is carried out as described above.

The starting materials used in reaction (a) and containing in 4-position the N-substituted azacyclic arylidenemethyl radical are obtained by reacting a compound of the formula

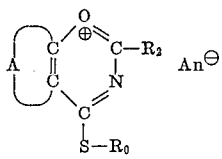

with the quaternary compound $[Q_0-CH_2-R_4]^{\oplus}$ $An^{\ominus}$. The reaction is carried out as previously described, preferably in the presence of a suitable base.

The invention also comprises any modification of the process, wherein a compound obtainable as an intermediate at any stage of the process is used as starting material in carrying out the remaining step(s) of the process; also included are any new starting materials and intermediates.

In the process of this invention, those starting materials are preferably used which lead to final products mentioned hereinbefore as being the preferred embodiments of the invention.

The compounds of this invention are useful in the form of compositions for enteral, parenteral or topical administration, which contain a pharmacologically effective amount of the compounds of this invention in admixture with a pharmaceutically acceptable, organic or inorganic, solid or liquid, carrier, which usually represents the major portion of the pharmaceutical composition. For making up the latter, there are employed carrier materials suitable for the preparation of pharmaceutical compositions, such as water, gelatine, sugars, e.g. lactose, glucose or sucrose, starches, e.g. corn starch, wheat starch or rice starch, stearic acid or salts thereof, e.g. calcium stearate or magnesium stearate, talc, vegetable oils, alcohol, benzyl alcohol, cetyl alcohol, petrolatum, gums, accacia, propylene glycol, polyalkylene glycols or any other known carrier for pharmaceutical compositions. The pharmaceutical preparations may be in solid form, e.g. capsules, tablets or dragees, in liquid form, e.g. solutions or suspensions, or in the form of emulsions, e.g. salves or creams. If desired, they may contain auxiliary substances, such as preserving, stabilizing, wetting, emulsifying or coloring agents, salts for varying the osmotic pressure or buffers. The above preparations are prepared according to the standard methods used for the manufacture of pharmaceutically acceptable compositions, which, if desired, may contain, in combination, other physiologically useful substances.

In order to be used as cyanine dyes in the sensitization of photographic silver halide emulsions, the arylidenemethyl compounds of this invention are dispersed in the emulsions, such as gelatino-silver halide emulsions, e.g. gelatino-silver bromide, gelatino-silver bromo-iodide, gelatino-silver chloride or gelatino-silver chloro-iodide. The methods of incorporating these dyes in emulsions are conventional and are described in the art.

The following examples are intended to illustrate the invention and are not to be construed as being limitations thereon. Temperatures are given in degrees centigrade.

Example 1

A mixture of 6.2 g. of 1,2-diphenyl-1,4,5,6,7,8-hexahydro-quinazolin-4-thione and 2.8 g. of methyl iodide in 200 ml. of acetone is refluxed for two hours. A yellow precipitate is formed which is filtered off and recrystallized from acetone to yield the 1,2-diphenyl-4-methylmercapto-5,6,7,8-tetrahydro-quinazolinium iodide of the formula

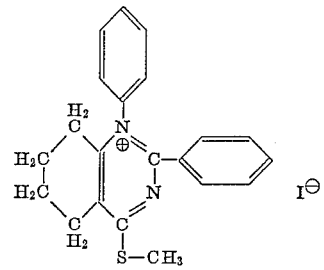

which melts at 261–263°; yield: 5.3 g.

The starting material used in the above procedure is prepared as follows: A mixture of 98.0 g. of cyclohexanone and 131.0 g. of morpholine in 300 ml. of benzene is refluxed overnight while separating the generated water in a water separator. The benzene is removed and the 1-(4-morpholino)-cyclohexene is distilled and collected at 182–185°/125 mm.

A solution of 55.0 g. of 1-(4-morpholino)-cyclohexene in 45 ml. of chloroform is added to 107 g. of N-benzoyl-isothiocyanate in 150 ml. of chloroform over a period of one hour while cooling and stirring in an atmosphere of nitrogen. The ice-bath is removed, and the reaction mixture is refluxed for thirty minutes and is then allowed to stand overnight. The precipitate is filtered off, and washed with diethyl ether and methanol; the 2-phenyl-5,6,7,8-tetrahydro-1,3-benzoxazin-4-thione melts at 197–199° after recrystallization from N,N-dimethylformamide.

A mixture of 5.0 g. of 2-phenyl-5,6,7,8-tetrahydro-1,3-benzoxazin-4-thione and 15.0 g. of aniline is refluxed for one hour. After cooling, 50 ml. of ethanol is added, and refluxing is continued for two additional hours. The crystalline material is filtered off; the 1,2-diphenyl-1,4,5,6,7,8-hexahydro-quinazolin-4-thione of the formula

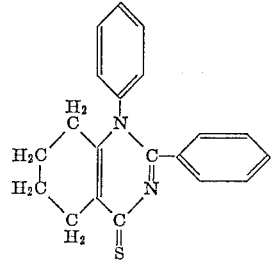

melts at 262–263° after recrystallization from ethanol; yield: 4.2 g.

The starting material used in the above procedure is also prepared as follows: A mixture of 50.0 g. of cyclohexanone and 70.0 g. of aniline in 200 ml. of benzene is refluxed for 2½ days using a water-separator to remove the generated water. The solvent is removed under reduced pressure, and the residue is distilled to yield the 1-anilino-cyclohexene, which is collected at 106–111°/1 mm.

To a solution of 5.5 g. of N-benzoyl-isothiocyanate in 20 ml. of diethyl ether is added over a period of thirty minutes 8.0 g. of 1-anilino-cyclohexene in 20 ml. of diethyl ether while cooling and maintaining an atmosphere of nitrogen. The orange precipitate is filtered off and washed with diethyl ether and methanol to yield the N-phenyl-thionoanthranilic acid N-benzoylamide, which melts at 85–87°.

9

A solution of 0.3 g. of N-phenyl-thionoanthranilic acid N-benzoyl-amide in 10 ml. of tetrahydrofuran is refluxed for one hour; an additional 90 ml. of tetrahydrofuran is added, and refluxing is continued for two hours. The precipitate is collected to yield the 1,2-diphenyl-1,4,5,6,7,8-hexahydro-quinazolin-4-thione, M.P. 265–267° C.

The latter is also obtained directly by adding over a period of one hour, 6.0 g. of 1-anilino-cyclohexane in 25 ml. of tetrahydrofuran to a solution of 5.5 g. of N-benzoyl-isothiocyanate in 25 ml. of tetrahydrofuran while cooling in an ice bath under an atmosphere of nitrogen. The precipitate is recrystallized from ethanol to yield the desired 1,2-diphenyl-1,4,5,6,7,8-hexahydroquinazolin - 4 - thione, M.P. 263–265°.

The starting material may also be obtained according to the following procedure: A mixture of 23.9 g. of benzoic acid N-phenyl-amide and 22.0 g. of thionyl chloride is refluxed on the steam bath for six hours; the excess of thionyl chloride is evaporated under reduced pressure, the residue crystallizes upon cooling and is recrystallized from pentane to yield the N-phenyl-benzimidoyl chloride, which melts at 40°; yield: 19.5 g., and is identical with the compound described by von Braun et al., Ber., vol. 67, p. 1218 (1934).

A mixture of 2.15 g. of N-phenyl-benzimidoyl chloride and 3.23 g. of lead thiocyanate in 30 ml. of dry benzene is refluxed for two hours. The mixture is filtered and evaporated to dryness under reduced pressure. The residue is triturated with dry pentane; the solid material is filtered off and the filtrate is evaporated to dryness under reduced pressure at room temperature. The residue is dissolved in 15 ml. of dry p-dioxane, and the solution containing the N-phenyl-benzimidoyl isothiocyanate is cooled in an ice-bath. To this solution is added dropwise 1.57 g. of 1-(4-morpholino)-cyclohexene while cooling. Upon standing overnight at room temperature, the 1,2-diphenyl-1,4,5,6,7,8 - hexahydroquinazolin - 4 - thione precipitates, M.P. 260–274°.

Example 2

A mixture of 3.8 g. of 1-n-decyl-2-phenyl-1,4,5,6,7,8-hexahydro-quinazolin-4-thione and 2.13 g. of methyl iodide in 50 ml. of acetone is shaken until a complete solution is obtained. The solvent is then removed under reduced pressure, and the desired 1-n-decyl-4-methylmercapto-2-phenyl-5,6,7,8-tetrahydro-quinazolinium iodide of the formula

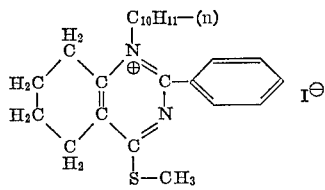

is obtained as a brown viscous oil, which is not further purified.

The starting material used in the above procedure is prepared as follows: A mixture of 4.0 g. of 2-phenyl-5,6,7,8-tetrahydro-1,3-benzoxazin-4-thione and 10 ml. of n-decylamine in 50 ml. of ethanol is refluxed for twenty minutes. The resulting solid material is filtered off; the desired 1-n-decyl-2-phenyl-1,4,5,6,7,8 - hexahydro - quinazolin - 4 - thione of the formula

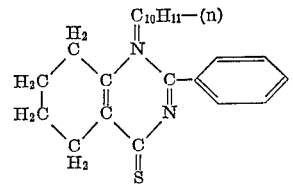

melts at 155–156° after recrystallization from ethanol.

Example 3

A mixture of 4.1 g. of 1-(4-fluoro-phenyl)-2-phenyl-1,4,5,6,7,8-hexahydro-quinazolin - 4 - thione and 1.7 g. of methyl iodide in 300 ml. of acetone is refluxed for four hours. After cooling, the precipitate is filtered off to yield the 1-(4-fluorophenyl)-4-methylmeracpto-2-phenyl - 5,6,7,8-tetrahydro-quinazolinium iodide of the formula

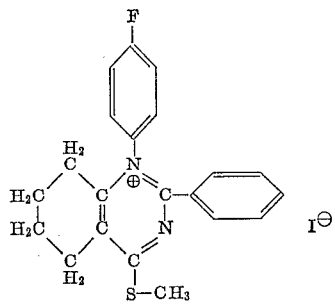

which melts at 257–258° after recrystallization from acetone.

The starting material used in the above procedure is prepared as follows: A mixture of 5.0 g. of 2-phenyl-5,6,7,8-tetrahydro-1,3-benzoxazin-4-thione and 9.0 g. of 4-fluoro-aniline in 50 ml. of ethanol is refluxed for four hours. The yellow precipitate is filtered off and recrystallized from ethanol to yield the 1-(4-fluoro-phenyl)-2-phenyl-1,4,5,6,7,8-hexahydro-quinazolin - 4 - thione of the formula

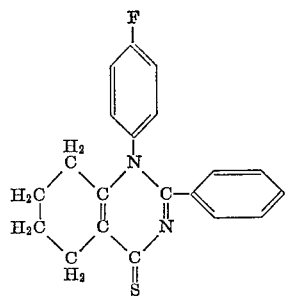

which melts at 307–310°.

Example 4

The 1-(4-fluoro-phenyl)-4-methylmercapto-2-(4-methyl-phenyl)5,6,7,8-tetrahydro-quinazolinium iodide is obtained by reacting a mixture of 6.7 g. of 1-(4-fluoro-phenyl) - 2 - (4-methyl-phenyl)-1,4,5,6,7,8-hexahydro-quinazolin-4-thione and 2.8 g. of methyl iodide in 200 ml. of ethanol according to the procedure described in Example 1.

The starting material used in the above procedure is prepared as follows: To a cold solution of 7.5 g. of 4-fluoro-aniline in 25 ml. of pyridine is added dropwise 10.5 g. of crude 4-methyl-benzoyl chloride. The resulting mixture is poured into approximately 250 ml. of water; the precipitate is filtered off, dried and recrystallized from methanol using a charcoal preparation for decolorization. The desired 4-methyl-benzoyl N-(4-fluorophenyl)-amide melts at 185–188°.

A mixture of 10.0 g. of 4-methyl-benzoyl N-(4-fluorophenyl)-amide and 25 ml. of thionyl chloride is refluxed overnight and is then evaporated under reduced pressure. The residue is recrystallized from a mixture of diethyl ether and pentane to yield the N-(4-fluoro-phenyl)-4-methyl-benzimidoyl chloride, M.P. 88–91°.

A mixture of 5.6 g. of N-(4-fluoro-phenyl)-4-methyl-benzimidoyl chloride and 7.45 g. of lead thiocyanate in 50 ml. of dry benzene is refluxed for two hours and is then filtered. The filtrate is concentrated to dryness under reduced pressure and the residue is triturated with dry pentane. The solid material is filtered off; the pentane solution is concentrated and cooled to yield the N-(4-fluoro - phenyl) - 4 - methyl-benzimidoyl isothiocyanate which melts at 77–79° after recrystallization from pentane.

To a solution of 1.67 g. of 1-(4-morpholino)-cyclohexene in 10 ml. of dry p-dioxane is added dropwise a solution of 2.7 g. of the N-(4-fluoro-phenyl)-4-methyl-benzimidoyl isothiocyanate in 15 ml. of dry p-dioxane. The solution is allowed to stand at room temperature overnight after having been seeded with a small amount of 1 - (4 - fluoro-phenyl)-2-(4-methyl-phenyl)-5,6,7,8-tetrahydro-quinazolin-4-thione. The product melts at 291–293° after recrystallization from acetone.

Example 5

The 2-(4-chloro-phenyl)-1-(4-fluoro-phenyl)-4-methyl-mercapto-5,6,7,8-tetrahydro-quinazolinium iodide is prepared by reacting a mixture of 7.1 g. of 2-(4-chloro-phenyl) - 1 - (4-fluoro-phenyl) - 1,4,5,6,7,8-hexahydro-quinazolin-4-thione and 3.0 g. of methyl iodide in 200 ml. of ethanol as described in Example 1.

The starting material used in the above procedure is prepared as described in Example 4, i.e. by reacting 4-chloro-benzoyl chloride with 4-fluoro-aniline, treating the resulting 4 - chlorobenzoyl N - (4-fluoro-phenyl)-amide (M.P. 179–181° after recrystallization from ethanol) with thionyl chloride, converting the N-(4-fluoro-phenyl) 4-chloro-benzimidoyl chloride (M.P. 78–80° after recrystallization from pentane) into the N-(4-fluoro-phenyl) 4-chloro-benzimidoyl isothiocyanate by treatment with lead thiocyanate, and reacting the N-(4-fluoro-phenyl) 4-chloro-benzimidoyl isothiocyanate, M.P. 85–87° after recrystallization from pentane with 1-(4-morpholino)-cyclohexene; the 2-(4-chloro-phenyl)-1-(4-fluoro-phenyl) - 1,4,5,6,7,8 - hexahydro-quinazolin-4-thione of the formula

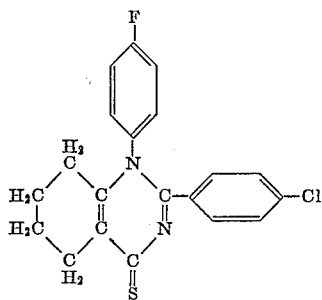

melts above 300° after recrystallization from acetone.

Example 6

A mixture of 7.0 g. of 1-(4-fluoro-phenyl)-2-(4-methoxy - phenyl) - 1,4,5,6,7,8-hexahydro-quinazolin-4-thione and 3.0 g. of methyl iodide in 200 ml. of ethanol, when reacted as described in Example 1 yields the 1-(4-fluoro-phenyl) - 2 - (4 - methoxy-phenyl)-4-methylmercapto-5,6,7,8-tetrahydro-quinazolinium iodide.

The starting material used in the above procedure is prepared as described in Example 4, i.e. by reacting 4-methoxy-benzoyl chloride with 4-fluoro-aniline to form the 4-methoxy-benzoyl N-(4-fluoro-phenyl)-amide, which is treated with thionyl chloride; the resulting N-(4-fluoro-phenyl)-4-methoxy-benzimidoyl chloride is reacted with lead thiocyanate, and the N-(4-fluoro-phenyl) 4-methoxy-benzimidoyl isothiocyanate is converted into the 1-(4-fluoro - phenyl) - 2-(4-methoxy-phenyl)-1,4,5,6,7,8-hexahydro-quinazolin-4-thione of the formula

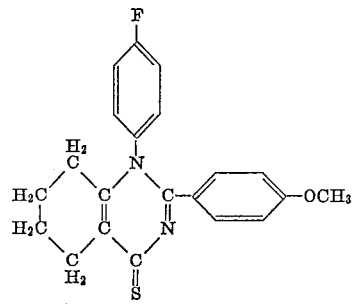

by reacting it with 1-(4-morpholino)-cyclohexene.

Example 7

Other compounds of this invention, which are prepared according to the above-described and illustrated procedure by selecting the appropriate starting materials, are, for example, 1,2-diphenyl-4-methylmercapto-cyclopenta[e]pyrimidinium iodide, prepared by reacting cyclopentanone with morpholine and removing the generated water, reacting the 1-(4-morpholino)-cyclopentene with N-benzoyl-isothiocyanate, and the resulting 2-phenyl-cyclopenta[e]1,3-benzoxazin-4-thione with aniline, and quaternizing the 1,2-diphenyl-1,4-dihydro-cyclopenta[e] pyrimidin-4-thione with methyl idoide;

1 - (4 - methoxy - phenyl)-4-methylmercapto-2-phenyl-cyclopenta[e]pyrimidinium iodide, prepared by reacting 2 - phenyl-cyclopenta[e]1,3-benzoxazin-4-thione with p-anisidine, and quaternizing the 1-(4-methoxy-phenyl)-2-phenyl-1,4-dihydro-cyclopenta[e]pyrimidin-4-thione with methyl iodide;

2 - benzyl - 1 - (4 - chloro-phenyl)-4-ethylmercapto-5,6,7,8-tetrahydro-quinazolinium iodide, prepared by reacting 1-(4-morpholino)-cyclohexene with N-phenacetyl-isothiocyanate, treating the resulting 2-benzyl-5,6,7,8-tetrahydro-1,3-benzoxazin-4-thione with 4-chloro-aniline, and quaternizing the 2-benzyl-1-(4-chloro-phenyl)-1,4,5,6,7,8-hexahydro-quinazolin-4-thione with ethyl iodide;

4-benzyl mercapto-2-ethyl-1-(4-methyl-phenyl)-5,6,7,8-tetrahydro-quinazolinium bromide, prepared by reacting 1-(4-morpholino)-cyclohexene with N-propionyl-isothiocyanate, treating the resulting 2-ethyl-5,6,7,8-tetrahydro-1,3-benzoxazin-4-thione with p-toluidine, and quaternizing the 2-ethyl-1(4-methyl-phenyl)-1,4,5,6,7,8-hexahydro-quinazolin-4-thione with benzyl bromide;

2 - (4 - bromo-phenyl)-1-methyl-4-methylmercapto-5,6,7,8-tetrahydro-quinazolinium iodide, prepared by reacting 1-(4-morpholino)-cyclohexene with N-(4-bromo-benzoyl)-isothiocyanate, treating the resulting 2-(4-bromo-phenyl) - 5,6,7,8-tetrahydro-1,3-benzoxazin-4-thione with methylamine, and quaternizing the 2-(4-bromo-phenyl)-1 - methyl-1,4,5,6,7,8-hexahydro-quinazolin-4-thione with methyl iodide;

4 - methylmercapto - 2 - phenyl - 1 - (4 - trifluoromethyl - phenyl)-5,6,7,8-tetrahydro-quinazolinium iodide, prepared by reacting 2 - phenyl - 5,6,7,8 - tetrahydro - 1,3-benzoxazin-4-thione with p-trifluoromethyl-aniline and quaternizing the 2-phenyl-1-(4-trifluoromethyl-phenyl)-1,4,5,6,7,8 - hexahydro - quinazolin-4-thione with methyl iodide;

4 - methylmercapto - 2 - (3 - nitro - phenyl) - 1 - phenyl-5,6,7,8-tetrahydro-quinazolinium iodide, prepared by reacting 1-(4-morpholino)-cyclohexene with N-(3-nitro-benzoyl)-isothiocyanate, treating the resulting 2-(3-nitro-phenyl) - 5,6,7,8-tetrahydro-1,3-benzoxazin-4-thione with aniline, and quaternizing the 2-(3-nitro-phenyl)-1-phenyl-5,6,7,8-tetrahydro-1,3-benzoxazin-4-thione with methyl iodide;

4 - methylmercapto - 1 - (4 - methylmercapto - phenyl)-2 - phenyl - 5,6,7,8 - tetrahydro-quinazolinium iodide, prepared by reacting 2-phenyl-5,6,7,8-tetrahydro-1,3-benzoxazin-4-thione with 4-methylmercapto-aniline and quaternizing the 1-(4-methylmercapto-phenyl)-2-phenyl-1,4,5,6,7,8-hexahydro-quinazolin-4-thione with methyl iodide;

1 - benzyl - 6 - methyl - 4 - methylmercapto - 2 - phenyl-5,6,7,8-tetrahydro-quinazolinium iodide, prepared by reacting 4-methyl-cyclohexanone with morpholine and removing the generated water, treating the 4-methyl-1-(4-morpholino)-cyclohexene with N-benzoyl-isothiocyanate, reacting the resulting 6 - methyl - 2 - phenyl-5,6,7,8-tetrahydro - 1,3 - benzoxazin - 4 - thione with benzylamine, and quaternizing the 1-benzyl-6-methyl-2-phenyl-1,4,5,6,7,8-hexahydro-quinazolin-4-thione with methyl iodide;

1,2 - diphenyl - 4 - methylmercapto - cyclohepta[e] pyrimidinium iodide, prepared by reacting cycloheptanone with morpholine and removing the generated water in a water separator, treating the 1-(4-morpholino)-cycloheptene with N-benzoyl-isothiocyanate, reacting the resulting 2 - phenyl - cyclohepta[e]1,3 - benzoxazin-4-thione with aniline, and quaternizing the 1,2-diphenyl-1,4-dihydro-cyclohepta[e]pyrimidine with methyl iodide; and the like.

Example 8

A mixture of 1.0 g. of 4-(3-methyl-2-benzothiazolylidene - methyl) - 2 - phenyl - 5,6,7,8 - tetrahydro - 1,3-benzoxazinium iodide and 10 ml. of aniline is refluxed for one hour. After chilling, a precipitate is formed, which is filtered off and washed with diethyl ether to yield the 1,2-diphenyl - 4 - (3 - methyl - 2 - benzothiazolylidenemethyl)-5,6,7,8-tetrahydro-quinazolinium iodide of the formula

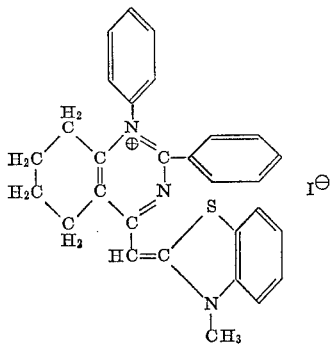

which melts at 312–314° after recrystallization from ethanol.

Other compounds, which are prepared by reacting 4-(3 - methyl - 2 - benzothiazolylidene - methyl) - 2 - phenyl-5,6,7,8 - tetrahydro - 1,3 - benzoxazinium iodide with an amine, such as 4-fluoro-aniline, N,N-diethyl-1,2-ethylenediamine, N,N-dimethyl-1,2-ethylenediamine, n-propylamine, methylamine, 3 - amino - pyridine, N,N - diethyl - 1,4-phenylenediamine and the like, are, for example, 1-(4-fluorophenyl) - 4 - (3 - methyl - benzothiazolylidenemethyl)-2-phenyl-5,6,7,8-tetrahydro-quinazolinium iodide, M.P. 271–272° after recrystallization from ethanol; and 1 - (2 - N,N - diethylaminoethyl) - 4 - (3 - methyl - 2-benzothiazolylidene - methyl) - 2 - phenyl - 5,6,7,8 - tetrahydro-quinazolinium iodide, M.P. 194–196° after recrystallization from ethanol; as well as 4-(3-methyl-2-benzothiazolylidene - methyl) - 2 - phenyl - 1 - n - propyl - 5,6,7,8-tetrahydro-quinazolinium iodide, M.P. 245–246° after recrystallization from ethanol; 1-methyl-4-(3-methyl-2-benzothiazolylidene - methyl) - 2 - phenyl - 5,6,7,8 - tetrahydro-quinazolinium iodide, 1-(2-dimethylamino-ethyl)-4-(3 - methyl - 2 - benzothiazolylidene - methyl) - 2 - phenyl-5,6,7,8-tetrahydro-quinazolinium iodide, M.P. 228–230° after recrystallization from methanol; 1-(3-pyridyl)-4-(3-methyl - 2 - benzothiazolylidene - methyl) - 2 - phenyl-5,6,7,8-tetrahydro-quinazolinium iodide, M.P. 266–267° (decomp.) after recrystallization from methanol; 1-(4-diethylamino - phenyl) - 4 - (3 - methyl - 2 - benzothiazolylidene - methyl) - 2 - phenyl - 5,6,7,8 - tetrahydro-quinazolinium iodide, and the like.

The starting material used in the above procedure is prepared as follows: A mixture of 5.0 g. of 2-phenyl-5,6,7,8-tetrahydro-1,3-benzoxazin-4-thione and 4.5 g. of methyl iodide in 80 ml. of acetone is refluxed for one hour and is then cooled. The precipitate is filtered off and washed with acetone to yield the 4-methylmercapto-2-phenyl-5,6,7,8-tetrahydro-1,3-benzoxazinium iodide which melts at 183° (with decomp.) after drying.

A mixture of 23.0 g. of 4-methylmercapto-2-phenyl-5,6,7,8-tetrahydro-1,3-benzoxazinium iodide and 17.5 g. of 2-methyl-benzothiazole methiodide in 350 ml. of ethanol containing 10 ml. of triethylamine is heated just below reflux temperature for one hour. After cooling, the solid material is filtered off and washed with diethyl ether to yield the 4 - (3 - methyl - 2 - benzothiazolylidenemethyl) - 2 - phenyl-5,6,7,8-tetrahydro-1,3-benzoxazinium iodide of the formula

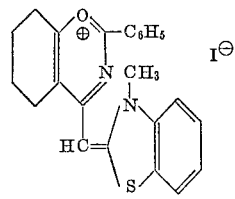

which melts at 313–314° after recrystallization from methanol.

Example 9

A mixture of 3.2 g. of 4-(1-ethyl-2-quinolylidenemethyl) - 2 - phenyl - 5,6,7,8 - tetrahydro - 1,3 - benzoxazinium iodide and 20 ml. of 4-fluoro-aniline, when reacted as described in Example 8, yields the 4-(1-ethyl-2 - quinolylidene - methyl) - 1 - (4 - fluoro - phenyl) - 2-phenyl-5,6,7,8-tetrahydro-quinazolinium iodide of the formula

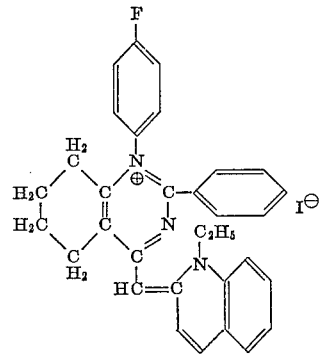

which melts at 252–253° after recrystallization from ethanol.

The starting material used in the above procedure is prepared as follows: A mixture of 10.0 g. of 4-methylmercapto - 2 - phenyl - 5,6,7,8 - tetrahydro - 1,3 - benzoxazinium iodide and 7.8 g. of 2-quinaldine ethiodide in 100 ml. of ethanol containing 4 ml. of N,N,N-triethylamine is refluxed for 2½ hours. After cooling, the precipitate is filtered off to yield the 4-(1-ethyl-2-quinolylidene - methyl) - 2 - phenyl - 5,6,7,8 - tetrahydro - 1,3-benzoxazinium iodide of the formula

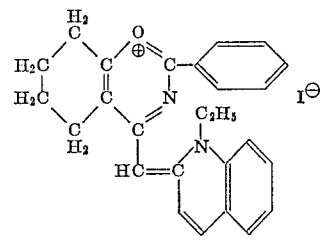

which melts at 256–258° (with decomposition).

Example 10

A mixture of 2.5 g. of 1,2-diphenyl-4-methylmercapto-5,6,7,8 - tetrahydro-quinazolinium iodide and 1.6 g. of 2-methyl-benzothiazole methiodide in 50 ml. of ethanol and 2 ml. of N,N,N-triethylamine if refluxed for twenty-four hours. After cooling, the precipitate is filtered off and recrystallized from ethanol to yield the 1,2-diphenyl-4-(3-methyl - 2 - benzothiazolylidene - methyl) - 5,6,7,8 - tetrahydro-quinazolinium iodide, M.P. 312–314°, which is identical with the compound obtained according to the procedure described in Example 8.

Example 11

A mixture of 2.5 g. of 1 - (4 - fluoro-phenyl)-4-methylmercapto - 2 - phenyl - 5,6,7,8 - tetrahydro-quinazolinium iodide and 1.5 g. of 2 - methyl-benzothiazole methiodide in 325 ml. of methanol containing 3 ml. of N,N,N-triethylamine is refluxed overnight. The major portion of the solvent is removed under reduced pressure, and the solid material is filtered off. The resulting 1 - (4 - fluorophenyl) - 4 - (3 - methyl-2-benzothiazolylidene-methyl)-2 - phenyl - 5,6,7,8 - tetrahydro-quinazolinium iodide melts at 271–272° after recrystallization from ethanol and is identical with the product obtained according to the procedure described in Example 8.

Example 12

A mixture of 0.5 g. of 1 - (4 - fluoro-phenyl) - 4 - methyl-mercapto - 2 - phenyl - 5,6,7,8 - tetrahydro-quinazolinium iodide and 0.3 g. of 2 - quinaldine methiodide in 10 ml. of ethanol and 0.5 ml. of N,N,N - triethylamine, when reacted as described in Example 11, yields the 1-(4-fluoro-phenyl) - 4 - (1-methyl-2-quinolylidene-methyl)-2-phenyl-5,6,7,8-tetrahydro-quinazolinium iodide of the formula

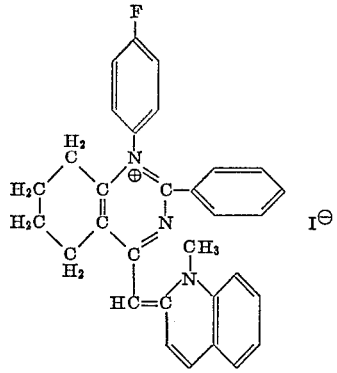

which melts at 220–223°.

Example 13

A mixture of 3.0 g. of 1-n-decyl-4-methylmercapto-2-phenyl-5,6,7,8-tetrahydro-quinazolinium iodine and 2.25 g. of 2-methyl-benzothiazole methiodide in 50 ml. of ethanol containing a few drops of N,N,N-triethylamine is refluxed overnight. The solvent is partially removed under reduced pressure, and upon cooling the desired 1-n-decyl-4 - (3 - methyl-2-benzothiazolylidene-methyl)-2-phenyl-5,6,7,8-tetrahydro-quinazolinium iodide of the formula

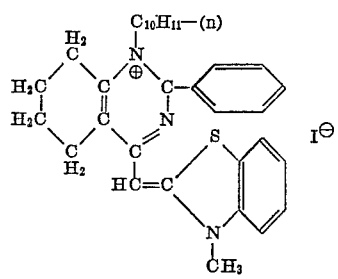

precipitates and is filtered off; it melts at 214–215° after recrystallization from ethanol.

Example 14

Other compounds of this invention, which are prepared according to the above described and illustrated procedure, are the following:

1,2 - diphenyl-4-(1-methyl-pyridylidene-methyl)-cyclopenta[e]pyrimidinium iodide, prepared by reacting 1,2-diphenyl - 4-methylmercapto-cyclopenta[e]pyrimidinium iodide with 2-picoline methiodide in the presence of N,N,N-triethylamine;

1 - 2 - diphenyl - 4-(3 - methyl-2-benzothiazolylidene-methyl)-cyclopenta[e]pyrimidinium iodide, prepared by reacting the 2 - phenyl - cyclopenta[e]1,3-benzoxazin-4-thione with methiodide, treating the 4-methylmercapto-2-phenyl - cyclopenta[e]1,3-benzoxazinium iodide with 2-methyl - benzothiazole methiodide in the presence of N,N,N-triethylamine, and converting the resulting 4-(3-methyl - 2 - benzothiazolylidene-methyl)-2-phenyl-cyclopenta[e]1,3-benzoxazinium iodide into the desired compound by treatment with aniline;

1,2 - diphenyl-4-(1-ethyl-2-quinolylidene-methyl)-cyclopenta[e]pyrimidinium iodide, prepared by reacting 1,2-diphenyl - 4 - methyl-mercapto-cyclopenta[e]pyrimidinium iodide with 2-quinaldine ethiodide in the presence of N,N,N-triethylamine;

1 - (4 - methoxy-phenyl)-4-(1-methyl-4-pyridylidene-methyl) - 2 - phenyl-cyclopenta[e]pyrimidinium iodide, prepared by reacting 1 - (4-methoxy-phenyl)-4-methyl mercapto - 2 - phenyl-cyclopenta[e]pyrimidinium iodide, with 4-picoline methiodide in the presence of N,N,N-triethylamine;

2 - benzyl - 1-(4-chloro-phenyl)-4-(3-methyl-2-benzothiazolyl - methyl) - 5,6,7,8-tetrahydro-quinazolylinium iodide, prepared by reacting 2-benzyl-1-(4-chloro-phenyl)-4 - ethylmercapto-5,6,7,8-tetrahydro-quinazolinium iodide with 2-methyl-benzothiazole methiodide in the presence of N,N,N-triethylamine;

2 - ethyl - 4-(2-methyl-1-isoquinolylidene-methyl)-1-(4 - methyl - phenyl) - 5,6,7,8-tetrahydro-quinazolinium iodide, prepared by reacting 2-ethyl-5,6,7,8-tetrahydro-1,3-benzoxazin-4-thione with methyl iodide, treating the 2 - ethyl - 4-methylmercapto-5,6,7,8-tetrahydro-1,3-benzoxazinium iodide with 1-methyl-isoquinoline methiodide in the presence of N,N,N-triethylamine, and treating the resulting 2-ethyl-4-(2-methyl-1-isoquinolylidene-methyl)-5,6,7,8 - tetrahydro-1,3-benzoxazinium iodide with p-toluidine;

2 - ethyl-4-(3-methyl-2-benzothiazolylidene-methyl)-1-(4 - methyl - phenyl) - 5,6,7,8-tetrahydro-quinazolinium iodide, prepared by reacting 4-benzylmercapto-2-ethyl-1-(4 - methyl - phenyl) - 5,6,7,8-tetrahydro-quinazolinium bromide with a large excess of sodium iodide in water and treating the 4 - benzylmercapto - 2 - ethyl-1-(4-methylphenyl)-5,6,7,8-tetrahydro-quinazolinium iodide with 2-methyl - benzothiazole methiodide in the presence of N,N,N-triethylamine;

2 - (4 - bromo - phenyl) - 4 - (6-N,N-diethylamino-1-methyl - 2 - quinolylidene-methyl)-1-methyl-5,6,7,8-tetrahydro-quinazolinium iodide, prepared by reacting 2-(4-bromo - phenyl) - 1 - methyl-4-methylmercapto-5,6,7,8-tetrahydro-quinazolinium iodide with 6-N,N-diethyl-amino-2-quinaldine methiodide in the presence of N,N,N-triethylamine;

4 - (3 - methyl - 2-thiazolylidene-methyl)-2-phenyl-1-(4 - trifluoromethyl - phenyl)-5,6,7,8-tetrahydro-quinazolinium iodide, prepared by reacting 4-methylmercapto-2-phenyl - 1-(4-trifluoromethyl-phenyl)-5,6,7,8-tetrahydro-quinazolinium iodide with 2-methyl-thiazole methiodide in the presence of N,N,N-triethylamine;

4 - (1 - methyl - 4 - quinolylidene-methyl)-2-(3-nitrophenyl) - 1 - phenyl - 5,6,7,8 - tetrahydro-quinazolinium iodide, prepared by reacting 4 - methylmercapto-2-(3- nitro - phenyl)-1-phenyl-5,6,7,8-tetrahydro-quinazolinium iodide with 4-quinaldine methiodide in the presence of N,N,N-triethylamine;

1,2-diphenyl-4-(1-methyl - 2 - pyridylidene - methyl)-5,6,7,8-tetrahydro-quinazolinium iodide, prepared by reacting 1,2-diphenyl-4-methylmercapto-5,6,7,8-tetrahydroquinazolinium iodide with 2-picoline methiodide in the presence of N,N,N-triethylamine;

1,2-diphenyl-4-(3-methyl-thiazolylidene-methyl)-5,6,7,8-tetrahydro-quinazolinium iodide, prepared by reacting 4-methylmercapto - 2-phenyl--5,6,7,8-tetrahydro-1,3-benzoxazinium iodide with 2-methyl-thiazole methiodide in the presence of N,N,N-triethylamine and reacting the 4-(3-methyl - 2 - thiazolylidene-methyl)-2-phenyl-5,6,7,8-tetrahydro-1,3-benzoxazinium iodide with aniline;

1,2 - diphenyl-4-(3-ethyl-2-oxazolylidene-methyl)-5-6,7,8-tetrahydro-quinazolinium iodide, prepared by reacting 1,2-diphenyl - 4 - methylmercapto-5-6,7,8-tetrahydro-quinazolinium iodide with 2-methyloxazole ethiodide in the presence of N,N,N-triethylamine;

1,2 - diphenyl - 4 - (3 - methyl-2-benzoxazolylidenemethyl) - 5,6,7,8 - tetrahydro - quinazolinium iodide, prepared by reacting 1,2 - diphenyl - 4 - methylmercapto-5,6,7,8 - tetrahydro - quinazolinium iodide with 2 -methylbenzoxazole methiodide in the presence of N,N,N-triethylamine;

2 - (4 - chloro - phenyl) - 1 - (4 - fluoro-phenyl)-4-(3-methyl - 2 - benzothiazolylidene - methyl) - 5,6,7,8 - tetrahydro - quinazolinium iodide, prepared by reacting 2 - (4 - chloro - phenyl) - 1 - (4 - fluoro-phenyl)-4-methylmercapto - 5,6,7,8 - tetrahydro - quinazolium iodide with 2-methylbenzothiazole methiodide in the presence of N,N,N-triethylamine;

1 - (4 - fluoro - phenyl) - 2 - (4 - methoxy-phenyl)-4-(1 - methyl - 2 - quinolylidene - methyl)5,6,7,8-tetrahydroquinazolinium iodide, prepared by reacting 1 - ( 4 - fluorophenyl) - 2 - (4 - methoxy-phenyl)-4-methylmercapto-5,6,7,8 - tetrahydro - quinazolinium iodide with 2 - quinaldine methiodide in the presence of N,N,N-triethylamine;

(4 - (3 - methyl - 2 - benzothiazolylidene - methyl)-1-(4 - methylmercapto-phenyl) - 2 - phenyl - 5,6,7,8 - tetrahydro - quinazolinium iodide, prepared by reacting 4-methylmercapto - 1 - (4 - methylmercapto - phenyl) - 2 - phenyl - 5,6,7,8 - tetrahydro-quinazolinium iodide with 2-methyl - benzothiazole methiodide in the presence of N,N,N-triethylamine;

1 - benzyl - 6 - methyl - 4 - (1-methyl-2-quinolylidenemethyl) - 2 - phenyl-5,6,7,8 - tetrahydro-quinazolinium iodide, prepared by reacting 6 - methyl - 2 - phenyl - 5,6,7,8 - tetrahydro - 1,3 - benzoxazin - 4 - thione with methyl iodide, treating the 6 - methyl - 4 - methylmercapto - 2 - phenyl - 5,6,7,8 - tetrahydro - 1,3 - benzoxazinium iodide with 2 - quinaldine methiodide in the presence of N,N,N - triethylamine, and reacting the 6-methyl-4 - (1 - methyl - 2 - quinolylidene-methyl)2-phenyl-5,6,7,8 - tetrahydro - 1,3 - benzoxazinium iodide with benzylamine;

1 - benzyl - 4 - (6 - chloro - 1 - ethyl-4-quinolylidenemethyl) - 2 - phenyl - 5,6,7,8 - tetrahydroquinazolinium iodide, prepared by reacting 1 - benzyl - 6 - methyl - 4 - methylmercapto - 2 - phenyl - 5,6,7,8 - tetrahydro-quinazolinium iodide with 6 - chloro - 4 -quinaldine methiodide in the presence of N,N,N-triethylamine;

1,2 - diphenyl - 4 - (1,3,3 - trimethyl - 2 - indolylidenemethyl) - 5,6,7,8 - tetrahydro - quinazolinium iodide, prepared by reacting 1,2 - diphenyl - 4 - methylmercapto-5,6,7,8 - tetrahydro-quinazolinium iodide with 2,3,3-trimethylindolenine methiodide in the presence of N,N,N-triethylamine;

1,2 - diphenyl - 4 - (3 - methyl - 2 - benzothiazolylidenemethyl) - cyclohepta[e]pyrimidinium iodide, prepared by reacting 1,2 - diphenyl - 4 - methylmercapto - cyclohepta[e]pyrimidinium iodide with 2 - methyl - benzothiazole methiodide in the presence of N,N,N-triethylamine;

1,2 - diphenyl - 4-(6-methoxy-1-methyl-2-quinolylidenemethyl) - cyclohepta[e]pyrimidinium iodide, prepared by reacting 1,2 - diphenyl - 4 - methylmercapto - cyclohepta[e]pyrimidinium iodide with 6 - methoxy - 2 - quinaldine methiodide in the presence of N,N,N-triethylamine; and the like.

Example 15

The mixture of 3.3 g. of 4 - (3 - n-butyl-2-benzoxazolylidene - methyl) - 2 - phenyl - 5,6,7,8 - tetrahydro - 1,3-benzoxazinium iodide, 1.0 g. of n-decylamine and 250 ml. of methanol is refluxed for two hours. From the reaction mixture the methanol is distilled off and the remaining oil crystallizes on standing overnight. Upon recrystallization from 2-propanol there is obtained the pure yellow 1 - n - decyl - 2 - phenyl - 4 - (3 - n-butyl-2-benzoxazolylidene - methyl) - 5,6,7,8 - tetrahydroquinazolinium iodide of the formula

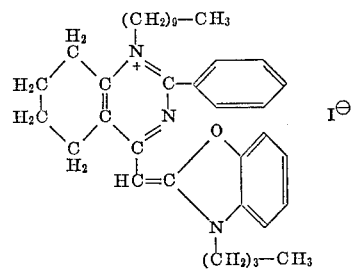

melting at 75°.

The starting material is prepared as follows:

10.0 g. of 2 - methyl - benzoxazole and 17.0 g. of n-butyl iodide are mixed together and the whole is heated in a sealed tube to 150° for 48 hours. The solid formed is recrystallized from ethanol to yield the 3-n-butyl-2-methyl-benzoxazolinium iodide melting at 147–150°.

The mixture of 24.0 g. of 4 - methylmercapto - 2 - phenyl - 5,6,7,8 - tetrahydro - 1,3 - benzoxazinium iodide, 13.0 g. of 3 - n - butyl - 2 - methyl - benzoxazolinium iodide, 10 ml. of triethylamine and 50 ml. of methanol is refluxed for 4 hours. Upon cooling the solution is allowed to stand for one day and hereupon a small amount of diethyl ether is added. On cooling the 4 - (3 - n - butyl-2 - benzoxazolylidene - methyl) - 2 - phenyl - 5,6,7,8-tetrahydro-1,3-benzoxazinium iodide crystallizes out. It is filtered off, washed with ice cold methanol-ether and dried; M.P. 260°.

In the analogous manner the following compounds are prepared by using the equivalent amounts of starting material:

(a) 1-n-undecyl-2-phenyl-4-(3-ethyl-2-benzoxazolylidenemethyl)-5,6,7,8-tetrahydro-quinazolinium iodide, M.P. 181–183° after recrystallization from isopropanol;
(b) 1-n-octyl-2-phenyl-4-(3-ethyl-2-benzoxazolylidenemethyl)-5,6,7,8-tetrahydro-quinazolinium iodide, M.P. 223–225° after recrystallization from isopropanol;
(c) 1 - n-decyl-2-phenyl-4-(3-n-propyl-2-benzoxazolylidene-methyl)-5,6,7,8-tetrahydro-quinazolinium iodide, M.P. 174–176° after recrystallization from isopropanol;
(d) 1-n-decyl-2-phenyl-4-(3-ethyl-2-benzoxazolylidenemethyl)-5,6,7,8-tetrahydro-quinazolinium iodide, M.P. 190–192° after recrystallization from isopropanol and
(e) 1-n-decyl-2-phenyl-4-(3-methyl-2-benzoxazolylidenemethyl)-5,6,7,8-tetrahydro-quinazolinium iodide, M.P. 190–191° after recrystallization from isopropanol.

The different starting materials may be obtained as follows:

20.2 g. of 2 - methyl - benzoxazole and 64.0 g. of methyl iodide are dissolved in 100 ml. of acetone and the whole is stirred overnight at room temperature. The solid formed is filtered off and washed with acetone to yield the 2,3-dimethyl-benzoxazolinium iodide melting at 199–200°.

The mixture of 20.2 g. of 2-methyl-benzoxazole and 28.8 g. of ethyl iodide is heated in a sealed tube to 100° for 48 hours. Upon cooling the solid formed is recrystallized from ethanol to yield the 3 - ethyl - 2 - methyl-benzoxazolinium iodide melting at 195–197°.

The corresponding 3-n-propyl-compound is prepared as the 3-ethyl compound from 30.0 g. of 2 - methyl-benzoxazole and 45.9 g. of n-propyl iodide; M.P. 194–196°.

The 4 - (3-methyl - 2 - benzoxazolylidene-methyl)-2-phenyl-5,6,7,8-tetrahydro-1,3-benzoxazinium iodide used as starting material for the compound listed under (e) melts at 269°.

The compound described in Example 12 may also be prepared according to the above described method from equivalent amounts of 4-(1 - methyl - 2 - quinolylidene-methyl)-2-phenyl-5,6,7,8-tetrahydro - 1,3 - benzoxazinium iodide (melting at 274–275°) and 4-fluoro-aniline.

Example 16

The mixture of 2 g. of 4-(3-ethyl-2-benzothiazolylidene-methyl) - 2 - phenyl - 5,6,7,8 - tetrahydro - 1,3 - benzoxazinium iodide and 5 ml. of 4-fluoro-aniline is refluxed for one hour. After chilling the reaction mixture and adding a small amount of diethyl ether, a precipitate is formed, which is filtered off and washed with diethyl ether to yield the 1 - (4 - fluoro - phenyl) - 2 - phenyl - 4 - (3 - ethyl - 2 - benzothiazolylidene-methyl)-5,6,7,8-tetrahydro - quinazolinium iodide of the formula

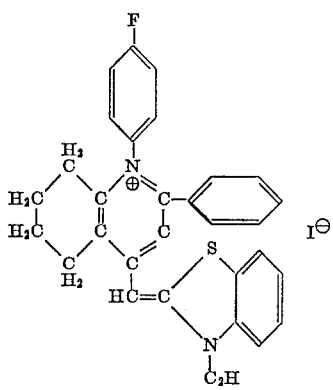

which melts at 285–287° after recrystallization from ethanol.

The starting material is prepared as shown in Example 8 and melts at 290–291°.

In the analogous manner the following compounds are prepared by using 2 g. of the iodide and 5 ml. of decylamine, 11 ml. of 4-dimethylamino-aniline or 5 ml. of 2-diethylamino-ethylamine respectively:

(a) 1-n-decyl-2-phenyl-4-(3-ethyl-2-benzothiazolylidene-methyl)-5,6,7,8-tetrahydro-quinazolinium iodide, M.P. 241–243° after recrystallization from ethanol, (b) 1 - (4 - dimethylamino - phenyl) - 2 - phenyl - 4 - (3 - methyl - 2 - benzothiazolylidene - methyl) 5,6,7,8-tetrahydro-quinazolinium iodide, M.P. 314–315° after recrystallization from methanol, and (c) 1 - (2 - diethylamino - ethyl) - 2 - phenyl - 4 - (3 - methyl - 2 - benzothiazolylidene - methyl) - 5,6,7,8-tetrahydro-quinoazolinium iodide, M.P. 192–193° after recrystallization from ethanol.

What is claimed is:
1. A compound of the formula

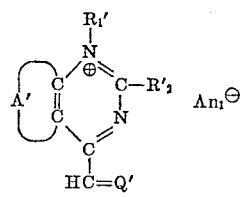

in which A' is 1,3-propylene, 1,4-butylene or 1,5-pentylene, each of the groups $R'_1$ and $R_2'$ [for a member selected from the group consisting of] is phenyl, (lower alkyl)-phenyl, (lower alkoxy)-phenyl, (halogeno)-phenyl, (lower alkylmercapto)-phenyl or (nitro)-phenyl, $R'_1$ is also alkyl with up to 12 carbon atoms, Q' is 1-lower alkyl-2-pyridylidene, 1-lower alkyl-4-pyridylidene, 1-lower alkyl-2-quinolylidene, 1-lower alkyl-4-quinolylidene, 2-lower alkyl-1-isoquinolylidene, 3-lower-alkyl-2-thiazolylidene, 3-lower alkyl-2-benzothiazolylidene, 3-lower alkyl-2-oxazolylidene, 3-lower alkyl-2-benzoxazolylidene or 1,3,3-tri-lower alkyl-2-indolylidene and $An^\ominus_1$ is the anion of a hydrohalic acid.

2. A compound of claim 1, in which formula A' is 1,4-butylene, each of $R'_1$ and $R'_2$ is phenyl, (lower alkyl) - phenyl, (lower alkoxy) - phenyl, (halogeno)-phenyl, (lower alkylmercapto)-phenyl or (nitro)-phenyl, $R'_2$ is also alkyl with up to 12 carbon atoms, Q' is 1-lower alkyl-2-pyridylidene, 1-lower alkyl-4-pyridylidene, 1-lower alkyl-2-quinolylidene, 1-lower alkyl-4-quinolylidene, 2-lower alkyl-1-isoquinolylidene, 3-lower alkyl-2-thiazolylidene, 3-lower alkyl-2-benzothiazolylidene, 3-lower alkyl-2-oxazolylidene, 3-lower alkyl-2-benzoxazolylidene or 1,3,3-tri- lower alkyl-2-indolylidene and $An^\ominus_1$ is the anion of a hydrohalic acid.

3. 1,2-diphenyl-4-(3-methyl-2-benzothiazolylidene-methyl)-5,6,7,8-tetrahydro-quinazolinium iodide.

4. 1-n-propyl-4-(3-methyl-2-benzothiazolylidene-methyl)-2-phenyl-5,6,7,8-tetrahydro-quinazolinium iodide.

5. 1-(2-dimethylamino-ethyl)-4-(3-methyl-2-benzothiazolylidene-methyl)-2-phenyl-5,6,7,8-tetrahydro-quinazolinium iodide.

6. 1-(3-pyridyl)-4-(3-methyl-2-benzothiazolylidene-methyl)-2-phenyl-5,6,7,8-tetrahydro-quinazolinium iodide.

7. 1-(4-fluoro-phenyl)-4-(1-ethyl-2-quinolylidene-methyl)-2-phenyl-5,6,7,8-tetrahydro-quinazolinium iodide.

8. 1-(4-fluoro-phenyl)-4-(3-methyl-2-benzothiazolylidene-methyl)-2-phenyl-5,6,7,8-tetrahydro-quinazolinium iodide.

9. 1-(4-fluoro-phenyl)-4-(1-methyl-2-quinolylidene-methyl)-2-phenyl-5,6,7,8-tetrahydro-quinazolinium iodide.

10. 1-n-decyl-4-(3-methyl-2-benzothiazolylidene-methyl)-2-phenyl - 5,6,7,8 - tetrahydro-quinazolinium iodide.

11. 1-n-decyl-4-(3-n-butyl-2-benzoxazolylidene-methyl)-2-phenyl-5,6,7,8-tetrahydro-quinazolinium iodide.

12. 1-n-undecyl-4-(3-ethyl-2-benzoxazolylidene-methyl)-2-phenyl-5,6,7,8-tetrahydro-quinazolinium iodide.

13. 1-n-octyl-4-(3-ethyl-2-benzoxazolylidene-methyl)-2-phenyl-5,6,7,8-tetrahydro-quinazolinum iodide.

14. 1-n-decyl-4-(3-n-propyl-2-benzoxazolylidene-methyl)-2-phenyl-5,6,7,8-tetrahydro-quinazolinium iodide.

15. 1-n-decyl-4-(3-ethyl-2-benzoxazolylidene-methyl)-2-phenyl-5,6,7,8-tetrahydro-quinazolinium iodide.

16. 1-n-decyl-4-(3-methyl-2-benzoxazolylidene-methyl)-2-phenyl-5,6,7,8-tetrahydro-quinazolinium iodide.
17. 1-(4-fluoro-phenyl)-4-(3-ethyl-2-benzothiazolylidene-methyl)-2-phenyl-5,6,7,8-tetrahydro-quinazolinium iodide.
18. 1-n-decyl-4-(3-ethyl-2-benzothiazolylidene-methyl)-2-phenyl-5,6,7,8-tetrahydro-quinazolinium iodide.
19. 1-(4-dimethylamino-phenyl)-4-(3-methyl-2-benzothiazolylidene-methyl)-2-phenyl-5,6,7,8-tetrahydro-quinazolinium iodide.
20. 1-(2-diethylamino-ethyl)-4-(3-methyl-2-benzothiazolylidene-methyl)-2-phenyl-5,6,7,8-tetrahydro-quinazolinium iodide.

References Cited
UNITED STATES PATENTS
3,149,105  9/1964  Larive et al. _____ 260—240.7

JOHN D. RANDOLPH, *Primary Examiner.*

WALTER A. MODANCE, *Examiner.*

H. I. MOATZ, *Assistant Examiner.*

UNITED STATES PATENT OFFICE
CERTIFICATE OF CORRECTION

Patent No. 3,385,850                          May 28, 1968

Richard William James Carney et al.

It is certified that error appears in the above identified patent and that said Letters Patent are hereby corrected as shown below:

Column 20, lines 15 and 16, cancel "[for a member selected from the group consisting of]".

Signed and sealed this 20th day of January 1970.

(SEAL)
Attest:

Edward M. Fletcher, Jr.                    WILLIAM E. SCHUYLER, JR.
Attesting Officer                            Commissioner of Patents